United States Patent [19]

Verhille et al.

[15] 3,649,264
[45] Mar. 14, 1972

[54] OPTICALLY SENSITIZED PHOTOCONDUCTIVE RECORDING ELEMENTS

[72] Inventors: Karel E. Verhille, Mortsel-Antwerpen; Theofiel Hubert Ghys, Kontich, both of Belgium

[73] Assignee: Gevaert-AGFA N.V., Mortsel, Belgium

[22] Filed: July 6, 1970

[21] Appl. No.: 56,134

Related U.S. Application Data

[63] Continuation of Ser. No. 628,550, Apr. 5, 1967, abandoned.

[30] Foreign Application Priority Data

Apr. 5, 1966 Great Britain.....................15,148/66

[52] U.S. Cl..............................96/1.7, 252/501, 260/386, 260/395
[51] Int. Cl.......................................G03g 7/00, H01l 13/00
[58] Field of Search..................................96/1.6–1.8; 8/32; 252/501

[56] References Cited

UNITED STATES PATENTS 3,238,149   3/1966   Spurr...................................252/501

OTHER PUBLICATIONS

The Chemistry of Synthetic Dyes, Venkataraman, Vol. 2, 1952, pp. 730–734

Primary Examiner—George F. Lesmes
Assistant Examiner—M. B. Wittenberg
Attorney—William J. Daniel

[57] ABSTRACT

Diarylmethane dyestuffs of the general formula

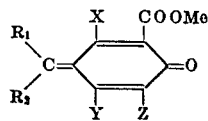

wherein:
Me is a cation selected from the group consisting of H, an onium group, or the cation of a metal salt,
each of $R_1$ and $R_2$ is an aromatic radical free of sulphonic acid groups, at least one of $R_1$ and $R_2$ being substituted by at least one ortho- and para-directing substituent selected from the group consisting of alkyl, halogen, amino, hydroxyl, and alkoxy groups; and
each of X, Y and Z is hydrogen or one of said ortho- and para-directing substituents, at least one of them being different from hydrogen, or
Y and Z together are the atoms necessary to close a condensed ring system,
are effective sensitizing dyes for sensitizing photoconductive zince oxide when applied from an aqueous coating medium. Preferably, the coating medium also contains a water-soluble binder for the zinc oxide.

4 Claims, No Drawings

OPTICALLY SENSITIZED PHOTOCONDUCTIVE RECORDING ELEMENTS

This application is a continuation of Ser. No. 628,550, filed Apr. 5, 1967 and now abandoned.

This invention relates to optically sensitized photoconductive recording elements, which are useful in electrophotographic copying.

Photoconductive coatings containing a finely divided photoconductive substance as e.g., photoconductive zinc oxide dispersed in a binder are well known. More particularly among others from the U.S. Pat. Nos. 2,197,552, 2,297,691, 2,485,589, 2,551,582 and 2,599,542 and from the U.K. Pat. Nos. 566,278, 693,112, and 700,502.

C. I. Young and J. C. Greig, R.C.A. Rev. 15 (1954) 469, described an electrophotographic material containing a photoconductive layer comprising a specially prepared photoconductive zinc oxide in an insulating resin binder. Said layer is coated on sufficiently conductive paper base, e.g., clay-coated paper, from a paintlike coating mixture by conventional paper-coating techniques. Since the zinc oxide has a brilliant white color it forms an excellent base for contrasting with the developer materials applied to it.

According to an existing technique mentioned in the U.S. Pat. No. 3,128,179 photoconductive zinc oxide can be sensitized by cyanine dyes, carbocyanine dyes and dicarbocyanine dyes, provided such dyes contain at least one carboxyl group.

Although optical sensitization of photoconductive zinc oxide dispersed in an organic solution of an insulating binder can be easily effected with said dyes, optical sensitization with these dyes in an aqueous medium, in other words in a photoconductive compound-binder system coated from water, is rather low.

It is an object of the present invention to provide a class of optical sensitizing agents for inorganic photoconductive substances such as photoconductive zinc oxide which are characterized by favorable optical sensitizing effects in organic medium as well as in aqueous medium.

Said object can be accomplished by the application of dyes which can be represented by the following general formula:

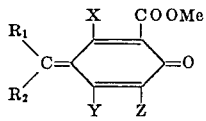

wherein:

Me represents a cationic radical, e.g., a hydrogen ion, an onium group or a metal salt cation, each of $R_1$ and $R_2$ represents an aromatic radical, e.g., a phenyl, naphthyl or heterocyclic radical with aromatic character, which radicals may be substituted by any substituent different from a sulphonic acid group, at least one of $R_1$ or $R_2$ being substituted by at least one ortho- and para-directing substituent e.g., alkyl, halogen, amino, substituted amino including said amino groups in salt form or in quaternized form, hydroxyl, and alkoxy, and X, Y and Z, at least one of them being different from hydrogen, represent a hydrogen atom or a substituent which is preferably an ortho- and para-directing substituent, or Y and Z represents the atoms necessary to close a condensed ring system e.g., a homocyclic or heterocyclic ring system.

Dyes which are preferably used according to the present invention can be represented by the following structural formula:

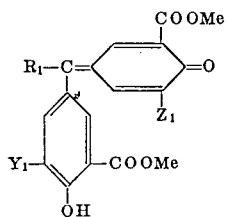

wherein:

$R_1$ represents a radical with aromatic character, e.g., a phenyl, naphthyl or heterocyclic radical with aromatic character which may be substituted by any substituent different from a sulphonic acid group, $Y_1$ and $z_1$ each represents an alkyl group e.g., a methyl group, and Me has the same meaning as described above.

The sensitizing substances according to said structural formulae are preferably used in combination with photoconductive zinc oxide. By the term "photoconductive zinc oxide" is to be understood a type of zinc oxide having photoconductive properties as is the case e.g., with zinc oxide prepared according to the french process.

The dyes used according to the present invention can be added at any moment of the preparation of the photoconductive composition. They can be used in an organic or aqueous composition preferably however, in combination with photoconductive zinc oxide dispersed in a coating the binder of which is applied from an aqueous medium since in such a coating their sensitizing activity is markedly higher than it is the case for other known optical sensitizing agents.

Zinc oxide-recording layers applied from organic solvents and binding agents soluble in the organic medium are e.g., described in Belgian Pat. No. 612,102.

Zinc oxide recording layers applied from an aqueous medium are e.g., described in the Published Dutch Pat. Nos. 66,08814 and 66,08815.

Preferably the optical sensitizing agents are added in dissolved state, e.g., dissolved in a water-miscible solvent or water, to a dispersion of the photoconductive zinc oxide. When used in aqueous medium, the latter is preferably to some extent alkaline ($pH>7$) which is the case in the preparation methods for photoconductive layers described in the former Dutch Patent Applications. The sensitizing agents used according to the present invention are in salt form very soluble in water.

Using the sensitizing substances of the present invention the coloration of a recording layer containing white photoconductive zinc oxide can be kept very low for a very high sensitizing effect.

The optimum quantity of sensitizing agent per gram of photoconductive zinc oxide can be easily determined by a series of tests. A useful range is comprised between 0.01 mg. and 1 mg. per gram of photoconductive zinc oxide. The ratio by weight of zinc oxide to binder may vary between relatively large limits. It is preferred to apply the photoconductive substance in a ratio of 1 part by weight of photoconductive substance to 0.1 to 0.6 part by weight of total content of binder. Preferably the coating mixture contains dispersed photoconductive zinc oxide in a ratio by weight of 95 to 60 percent in respect of the total solid content of the coated and dried layer. The thickness of the photoconductive layer may be chosen between wide limits according to the requirements of each case. Good recording and reproduction results are attained with electrophotographic layers of a thickness between 1 and 20 $\mu$, and preferably between 3 and 10 $\mu$. Too thin layers possess an insufficient insulating power, whereas too thick layers possess undesirably mechanical properties.

The photoconductive recording layers containing an optical sensitizing agent as described may contain, in addition to the photoconductive substance(s) and binder, optical sensitizers of any other type (see e.g., U.K. Pat. No. 1,020,504) compounds increasing the dark-resistivity e.g., the phosphorus compounds described in the Belgian Pat. NO. 612,102 and additives known in coating techniques, e.g., pigments (see e.g., U.K. Pat. No. 1,007,349), compounds influencing the gloss and/or the viscosity, and compounds which counteract aging and/or oxidation of the layers, or which influence the thermal stability of the layers. When selecting any additives, preference is given to those additives, which at least reduce the dark resistivity of the photoconductive layer.

The photoconductive composition sensitized according to the present invention may be coated on a support by a known coating technique e.g., by spraying, whirling, dip-coating or by a coating technique wherein use is made of a doctor blade. The supports or base materials are chosen in view of the particular charging, exposing, recording, developing and/or transfer technique wherein the recording material is to be used.

In electrophotographic recording techniques wherein the photoconductive layer is electrostatically charged, the support has preferably an electric volume resistivity considerably lower than that of the recording layer. Suitable supports are described e.g., in U.K. Pat. Nos. 995,491, 1,020,503 and 1,020,504 and in U.S. Pat. No. 3,008,825.

The photoconductive layer of an electrophotographic material prepared starting from a coating composition according to the present invention can be used for recording purposes wherein prior to exposure an electric charge is nondifferentially applied according to known methods. The material can, however, also be used in recording techniques wherein the exposure step preceeds a charging step. For such a technique we refer, e.g., to U.K. Pat. Nos. 1,033,419 and 1,033,420. Alternatively the material can be used in a recording and developing technique needing no charging step as described, e.g., in U.K. Pat. No. 935,621. In order to obtain recording results according to the latter technique, it has been found that the support of the recording layer need not be electrically conductive or more conductive than the recording layer.

In order to compare the sensitivity of photoconductive recording elements said elements are exposed in the same manner, e.g., through a step-wedge and developed in the same circumstances. Well-established methods of developing electrostatic images include cascade, powder-cloud, magnetic-brush and fur-brush development. These are all based on the presentation of charged dry toner to the surface bearing the electrostatic image. Other methods are based on the use of liquids either insulating or conductive liquids see e.g., U.S. Pat. No. 2,907,674 and the Belgian Pat. Nos. 610,060 and 625,335. Development of a conductivity image based on electrolysis is e.g., described by J. A. Amick, R.C.A. Rev. 20, 753 (1959).

The following examples illustrate the present invention without limiting it thereto.

EXAMPLE 1

A mixture of 20 g. of photoconductive zinc oxide, (type "-Blanc de zinc, Neige A" manufactured by Vieille Montagne, Hollogne-aux-Pierres, Belgium), 50 cc. of water, 2 g. of poly (vinyl acetatelcrotonic acid) (94.4/5.6), 1.37 g. of a 73% solution of Epok W-9801 (a melamine resin sold by British Resin Products), 0.82 cc. of a 10 percent solution of monobutyl phosphate, and 1 cc. of technical concentrated ammonium hydroxide was ground for 2 hours in a ball-mill. The obtained composition is used to be sensitized with one of the sensitizing agents mentioned in the following Table 1. Each sensitizing dye is added in an amount of 0.5 mg. per gram zinc oxide as a 0.1 percent solution in diacetone alcohol and intimately mixed with the ground composition.

Each sensitized composition is coated at a ratio of 25 g. per square meter onto a baryta coated paper of 90 g. per sq.m.

The obtained materials are under the same conditions negatively charged with a corona-discharging apparatus having between the ground and the wires a potential difference of —6000 V. After charging they are under the same circumstances exposed for 15 seconds by an incandescent lamp of 450 Watt, with an irradiation intensity of 2,280 lux through a step-wedge with a constant 0.1.

The differently sensitized layers are in the same circumstances electrophoretically developed. The sensitivity of the obtained recording layers is expressed by the number of steps corresponding with the discharged areas wherein no developing powder is deposited, thus having the original density of the recording layer. The higher that number, the more sensitive the layer.

TABLE 1

| Number of the structural formula of the dye listed in table 3 | Number of nonblackened steps |
|---|---|
| 1 | 9 |
| 2 | 5 |
| 3 | 20 |
| 4 | 16 |
| 5 | 15 |
| 6 | 20 |
| 7 | 16 |
| 8 | 11 |
| 9 | 17 |
| 10 | 21 |
| 11 | 15 |
| 12 | 18 |
| 13 | 15 |
| 14 | 12 |
| 15 | 15 |

EXAMPLE 2

To 30 g. of photoconductive zinc oxide ("type Blanc de zinc Neige A," manufactured by Vieille Montagne, Hollogne-aux-Pierres, Belgium), 50 cc. of water were added as well as 4.66 g. of Epok W-1772 (ammoniacal alkyd resin salt marketed as a 66 to 68 percent aqueous solution by British Resin Products) and 2.33 g. of PAREZ RESIN 613 (a dimethyl-trimethylol-melamine marketed by American Cyanamid Company). The mixture is ground for 2 hours in a ball-mill.

The obtained composition is used to be sensitized with one of the sensitizing agents mentioned in the following table. Each sensitizing dye is added in an amount of 0.5 mg. per gram zinc oxide as a 0.1 percent solution in diacetone alcohol and intimately mixed with the ground composition.

Each sensitized composition thus obtained is coated at a ratio of 150 cc./sq.m. to an aluminum-coated paper support. The coated layer is dried at room temperature and cured for 1 min. at 100° C.

The sensitivity listed in the following table 2 is expressed as in example 1.

TABLE 2

| Number of the structural formula of the dye listed in table 3 | Number of nonblackened steps |
|---|---|
| 1 | 11 |
| 2 | 11 |
| 3 | 18 |
| 4 | 24 |
| 5 | 17 |
| 6 | 21 |
| 7 | 9 |
| 8 | 16 |
| 9 | 24 |
| 10 | 14 |
| 11 | 16 |
| 12 | 10 |
| 13 | 20 |
| 14 | 15 |
| 15 | 5 |

Structural formula of the dyes

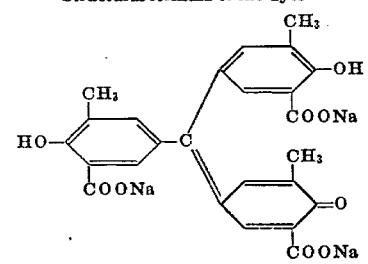

1

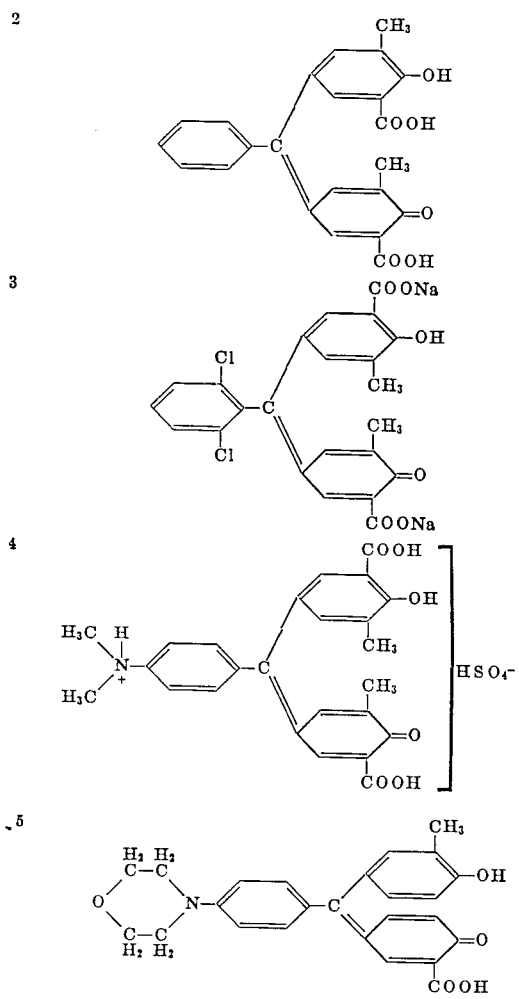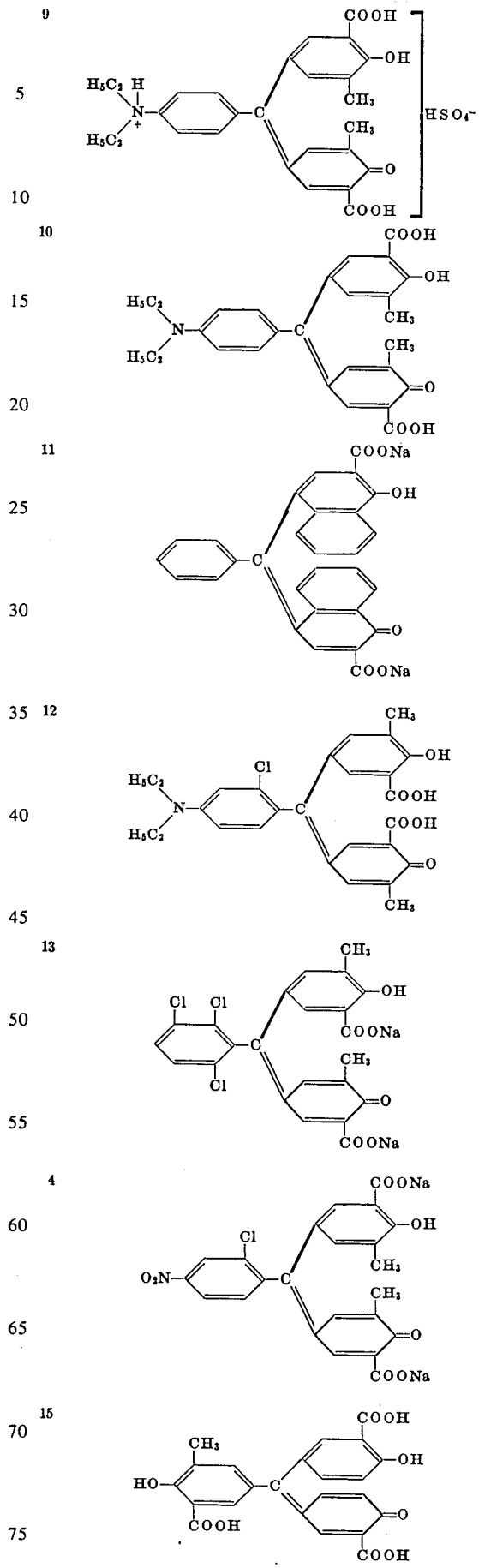

16

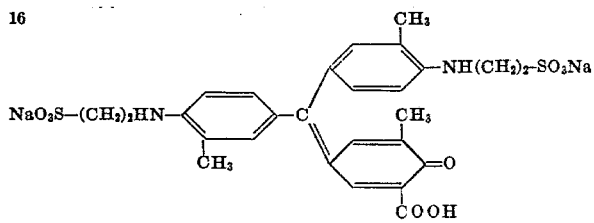

What is claimed:
1. An aqueous coating composition for preparing a photoconductive recording material comprising an aqueous medium, photoconductive zinc oxide dispersed in said medium, and a water-soluble dye corresponding to the following general formula:
wherein:

$R_1$ is an aryl group free of sulphonic acid groups, each of $Y_1$ and $Z_1$ is an alkyl group, and Me is a cation selected from the group consisting of H, an onium group, or the cation of a metal salt.

2. An aqueous coating composition according to claim 1, wherein said medium also contains a water-soluble binder for said zinc oxide.

3. A method for preparing a photoconductive recording material comprising the step of applying to a support a dispersion of photoconductive zinc oxide in an aqueous medium, said medium having dissolved therein a water-soluble dye corresponding to the following general formula:
wherein:

$R_1$ is an aryl group free of sulphonic acid groups, each of $Y_1$ and $Z_1$ is an alkyl group, and Me is a cation selected from the group consisting of H, an onium group, or the cation of a metal salt.

4. A method for preparing a photoconductive recording material according to claim 3, wherein said medium is an aqueous alkaline liquid having dissolved therein in addition to said dye a water-soluble binding agent for said zinc oxide.

UNITED STATES PATENT OFFICE
CERTIFICATE OF CORRECTION

Patent No. 3,649,264　　　Dated March 14, 1972

Inventor(s) Karel Eugeen VERHILLE et al

It is certified that error appears in the above-identified patent and that said Letters Patent are hereby corrected as shown below:

Column 7, between lines 22 and 23 of claim 1 and also
Column 8, between lines 12 and 13 of claim 3, insert the
following structural formula in each instance: --

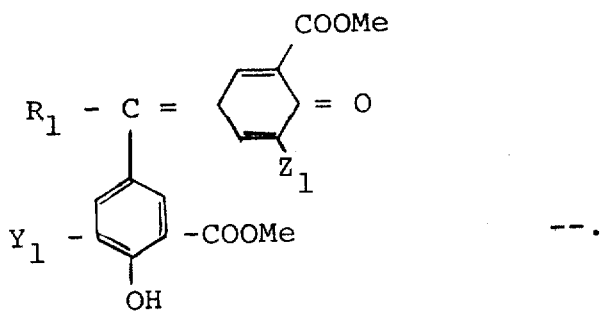

--.

Signed and sealed this 8th day of August 1972.

(SEAL)
Attest:

EDWARD M. FLETCHER, JR.　　　ROBERT GOTTSCHALK
Attesting Officer　　　　　　　Commissioner of Patents